US012387091B2

(12) United States Patent
Martin et al.

(10) Patent No.: US 12,387,091 B2
(45) Date of Patent: *Aug. 12, 2025

(54) ACTIVATION FUNCTIONS FOR DEEP NEURAL NETWORKS

(71) Applicant: Imagination Technologies Limited, Kings Langley (GB)

(72) Inventors: Christopher Martin, Leighton Buzzard (GB); Antonios Tsichlas, Watford (GB); Yuan Li, London (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,348

(22) Filed: Oct. 7, 2022

(65) Prior Publication Data

US 2023/0041966 A1 Feb. 9, 2023

Related U.S. Application Data

(62) Division of application No. 16/181,195, filed on Nov. 5, 2018, now Pat. No. 11,494,622.

(30) Foreign Application Priority Data

Nov. 3, 2017 (GB) .................................... 1718300

(51) Int. Cl.
*G06N 3/063* (2023.01)
*G06N 3/045* (2023.01)
(Continued)

(52) U.S. Cl.
CPC ............. *G06N 3/063* (2013.01); *G06N 3/047* (2023.01); *G06N 3/048* (2023.01); *G06N 3/045* (2023.01)

(58) Field of Classification Search
CPC ........ G06N 3/063; G06N 3/047; G06N 3/048; G06N 3/045
See application file for complete search history.

(56) References Cited

U.S. PATENT DOCUMENTS 6,983,389 B1 * 1/2006 Filippo ................. G06F 1/3215
713/324
8,238,609 B2 * 8/2012 Lookingbill ....... G06V 30/1456
382/292

(Continued)

FOREIGN PATENT DOCUMENTS

| EP | 3035205 A1 | 6/2016 |
| GB | 2566702 A | 3/2019 |
| WO | 2017108399 A1 | 6/2017 |

OTHER PUBLICATIONS

Zamanlooy et al. (Efficient VLSI Implementation of Neural Networks With Hyperbolic Tangent Activation Function, Jan. 2014, pp. 39-48) (Year: 2014).*

(Continued)

*Primary Examiner* — George Giroux
(74) *Attorney, Agent, or Firm* — Potomac Law Group, PLLC; Vincent M DeLuca

(57) ABSTRACT

Hardware for implementing a Deep Neural Network (DNN) for performing an activation function includes, at an activation module for performing an activation function, a programmable lookup table for storing lookup data approximating the activation function over a first range of input values to the activation module, the method comprising: providing calibration data to a representation of the hardware; monitoring an input to an activation module of the representation of the hardware so as to determine a range of input values to the activation module; generating lookup data for the lookup table representing the activation function over the determined range of input values; and loading the (Continued)

generated lookup data into the lookup table of the hardware, thereby configuring the activation module of the hardware for performing the activation function over the determined range of input values.

11 Claims, 7 Drawing Sheets

(51) Int. Cl.
*G06N 3/047* (2023.01)
*G06N 3/048* (2023.01)

(56) References Cited

U.S. PATENT DOCUMENTS

| | | | |
|---|---|---|---|
| 11,494,622 B2* | 11/2022 | Li | G06N 3/047 |
| 2002/0159466 A1 | 10/2002 | Rhoades | |
| 2003/0033194 A1* | 2/2003 | Ferguson | G06F 18/214 |
| | | | 705/7.29 |
| 2006/0017740 A1 | 1/2006 | Coleman | |
| 2013/0329833 A1 | 12/2013 | Bai | |
| 2016/0179434 A1 | 6/2016 | Herrero Abellanas et al. | |
| 2017/0103304 A1 | 4/2017 | Glenn et al. | |
| 2017/0103305 A1* | 4/2017 | Henry | G06N 3/044 |
| 2017/0103320 A1* | 4/2017 | Henry | G06F 9/321 |
| 2017/0103385 A1 | 4/2017 | Wilson, Jr. et al. | |
| 2017/0277658 A1 | 9/2017 | Pratas et al. | |
| 2018/0060278 A1* | 3/2018 | Lin | G06N 3/048 |

OTHER PUBLICATIONS

Piazza et al., "Neural Networks with Digital LUT Activation Functions," 1993, IJCNN '93 Nagoya. Proceedings of 1993 International Joint Conference on Neural Networks.

Hosseinzadeh et al., "Artificial Neural Networks Activation Function HDL Coder"; 2009, EIT '09. IEEE International Conference on Electro/Information Technology; Jun. 1, 2009; pp. 389-392.

Meher; "An Optimized Lookup-Table for the Evaluation of Sigmoid Function for Artificial Neural Networks"; 2010 18th IEEE/IFIP International Conference on VLSI and System-On-Chip; Nov. 22, 2010; pp. 91-95.

Nascimento et al; "A new solution to the hyperbolic tangent implementation in hardware: plynomial modeling of the fractional exponential part"; Neural Computing and Applications; vol. 23; No. 2; Apr. 6, 2012; pp. 363-369.

Szabo et al; "An Efficient Hardware Implementation of Feed-Forward Neural Networks"; Electronic Publishing, Artistic Imaging, and Digital Typography; vol. 2070; Jan. 1, 2001; pp. 300-313.

Namin et al; "Artificial neural networks activation function HDL coder"; IEEE International Conference on Electro/Information Technology; Jun. 1, 2009; pp. 389-392.

Saichand et al.,FPGA Realization of Activation Function for Artificial Neural Networks, Eighth Int'l Conference on Intelligent Systems Design and Applications, IEEE Computer Society 2008, pp. 159-164.

Fiori, "Hybrid Independent Component Analysis by Adaptive LUT Activation Function Neurons," Neural Networks vol. 15, 2002, pp. 85-94.

(Note: copies of NPL documents in parent apn).

* cited by examiner

ACTIVATION FUNCTIONS FOR DEEP NEURAL NETWORKS

CROSS-REFERENCE TO RELATED APPLICATIONS AND CLAIM OF PRIORITY

This application is a division, under 35 U.S.C. 121, of application Ser. No. 16/181,195 filed Nov. 5, 2018, now U.S. Pat. No. 11,494,622, which claims foreign priority under 35 U.S.C. 119 from United Kingdom Application No. 1718300.5 filed Nov. 3, 2017, the contents of which are incorporated by reference herein in their entirety.

BACKGROUND

The present disclosure relates to a method for configuring hardware for implementing a Deep Neural Network.

Deep Neural Networks (DNNs) are a type of artificial neural network having multiple layers between the input and output layers. DNNs can be used for machine learning applications. In particular, a deep neural network can be used in signal processing applications, including image processing and computer vision applications.

DNNs have typically been implemented in applications where power resources are not a significant factor. Despite this, DNNs have application in a number of different technical fields in which the resources of the hardware used to implement the DNNs are such that power consumption, processing capabilities, or silicon area are limited. Furthermore, the definition of a DNN for a particular application may vary over time—for example, as a result of additional training of the DNN.

There is therefore a need for a system for efficiently implementing a DNN in an area and power efficient manner which is flexible to the changing definition of a DNN.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a method for configuring hardware for implementing a Deep Neural Network (DNN) for performing an activation function, the hardware comprising, at an activation module for performing an activation function, a programmable lookup table for storing lookup data approximating the activation function over a first range of input values to the activation module, the method comprising:
  providing calibration data to a representation of the hardware;
  monitoring an input to an activation module of the representation of the hardware so as to determine a range of input values to the activation module;
  generating lookup data for the lookup table representing the activation function over the determined range of input values; and
  loading the generated lookup data into the lookup table of the hardware, thereby configuring the activation module of the hardware for performing the activation function over the determined range of input values.
The method may further comprise:
  receiving an input data stream to the hardware; and
  performing the activation function over the determined range of input values using the lookup table.

The DNN may use the activation module to perform multiple activation functions in order to process the input data stream, and the method further comprises repeating the providing, monitoring, generating and loading steps in respect of each activation function in order to generate and load lookup data for the lookup table representing each of the multiple activation functions.

The lookup table may comprise, and may be operable to switch between, two sets of lookup data and, on the activation module performing a series of activation functions, the loading of the generated lookup data of a next activation function in the series into the lookup table may be performed concurrently with the performing of a first activation function in the series.

The method may further comprise, on receiving the input data stream to the hardware, checking if an input value to the activation module lies outside the determined range of input values and, if the input value to the activation module lies outside the determined range of input values, using as an output value of the activation function the value of the activation function corresponding to the closest extreme of the determined range of input values.

The monitoring the input to the activation module may further comprise determining an offset that, when subtracted from each input value to the activation module, causes the range of input values to be substantially centred about a predefined input value, the performing the activation function comprising subtracting the offset from each input value received at the activation module prior to looking up each input value in the lookup table.

Performing the activation function may comprise, on receiving a first input value, looking up a pair of adjacent data points in the lookup table closest to the first input value and interpolating between a corresponding pair of values of the activation function so as to form an estimate of the value of the activation function corresponding to the first input value.

A predefined number of most significant bits of the first input value may be used as the lookup address into the lookup table and the remaining bits of the first input value are used in the interpolating between the corresponding pair of values of the activation function.

The lookup table may comprise first and second data stores, the first data store comprising a first set of data points and the second data store comprising a second set of data points such that for each adjacent pair of data points, one of the data points is in the first data store and the other data point is in the second data store, and the performing of the activation function for the first input value comprises simultaneously looking up each of the pair of adjacent points in their respective first or second data store.

The interpolation may be linear interpolation.

Generating lookup data may comprise calculating a set of curves approximating the activation function over the determined range of input values, each curve representing a portion of the activation function such that collectively the set of curves identify an output value for each input value within the determined range.

The method may further comprise, on receiving the input data stream to the hardware, checking if an input value to the activation module lies outside the determined range of input values and, if the input value to the activation module lies outside the determined range of input values, extrapolating the closest curve of the set of curves so as to provide an output value of the activation function.

The curves of the set of curves may be linear or quadratic curves.

Generating lookup data may comprise calculating a set of data points representing the activation function over the determined range of input values.

Monitoring the input to the activation module may comprise identifying maximum and minimum input values to the activation module and using those maximum and minimum input values as the bounds of the determined range of input values.

Monitoring the input to the activation module may comprise forming a histogram of input values representing the probability of occurrence of input values and using as the bounds of the determined range of input values a pair of input values between which a predefined or programmable proportion of the distribution of input values lies.

The calibration data may comprise exemplary input data selected so as to represent a wide variety of possible inputs to the hardware.

The determined range of input values may be less than the possible range of input values according to the bit length of the input values and the lookup data represents the activation function over less than that possible range of input values.

The lookup data may represent the activation function over a range equal to the determined range of input values.

The number of entries in the lookup data representing the activation function over the determined range of input values may be equal to the number of entries in the lookup table for the activation function.

The method may be performed subsequent to optimisation of the DNN.

According to a second aspect there is provided a data processing system comprising:
  a representation of hardware for implementing a Deep Neural Network (DNN) comprising an activation module for performing an activation function, the activation module comprising a programmable lookup table for storing lookup data representing an activation function; and
  a configuration module configured to:
    cause calibration data to be provided to the representation of the hardware;
    monitor an input to the activation module of the representation so as to determine a range of input values to the activation module; and
    generate lookup data for the lookup table representing the activation function over the determined range of input values;
  wherein, when loaded at a lookup table of an activation module of the hardware, the generated lookup data is adapted to cause that activation module to perform the activation function over the determined range of input values.

Processing of the DNN may require a plurality of activation functions to be performed, and the configuration module is configured to determine a range of input values to the activation module in respect of each of the activation functions and generate respective lookup data representing each activation function.

The hardware may comprise a plurality of activation modules and the configuration module is configured to independently generate lookup data for each activation function performed at each activation module.

The configuration module may be provided in software running at the data processing system.

According to a third aspect there is provided hardware for implementing a Deep Neural Network (DNN) comprising an activation module for performing an activation function, the activation module having a programmable lookup table for storing lookup data representing the activation function, and, in use, the activation module being configured to load into the lookup table first lookup data generated over a determined range of input values to the activation module for use in performing the activation function;
wherein the range of input values to the activation module is determined by monitoring the inputs to an activation module of a representation of the hardware which is arranged to operate on calibration data.

According to a fourth aspect there is provided hardware for implementing a Deep Neural Network (DNN) comprising an activation module for performing an activation function, the activation module comprising:
  a programmable lookup table for storing lookup data representing an activation function over a range of input values to the activation module;
  a Rectified Linear Unit (ReLU) operable to perform a ReLU activation function; and
  configuration logic configured to, on the DNN requiring the activation module to implement a ReLU activation function, cause the activation module to perform the activation function at the ReLU and turn off the programmable lookup table.

On the DNN requiring the activation module to implement an activation function using the lookup table, the ReLU unit may be configured to clamp input values received at the activation module which lie outside the determined range of input values at the closest extreme of the determined range of input values, the clamped input values being subsequently passed to the lookup table for implementation of the activation function.

A data processing system may be configured to perform any of the methods disclosed herein.

The hardware disclosed herein may be embodied on an integrated circuit.

There is provided a method of manufacturing hardware using an integrated circuit manufacturing system.

There is provided a method of manufacturing, using an integrated circuit manufacturing system, hardware as described herein, the method comprising:
  processing, using a layout processing system, a computer readable description of the hardware so as to generate a circuit layout description of an integrated circuit embodying the hardware; and
  manufacturing, using an integrated circuit generation system, the hardware according to the circuit layout description.

Computer program code may be adapted to perform any of the methods disclosed herein.

There is provided a non-transitory computer readable storage medium having stored thereon computer readable instructions that, when executed at a computer system, cause the computer system to perform any of the methods disclosed herein.

There is provided an integrated circuit definition dataset that, when processed in an integrated circuit manufacturing system, configures the integrated circuit manufacturing system to manufacture hardware as described herein.

There is provided a non-transitory computer readable storage medium having stored thereon a computer readable description of hardware as described herein that, when processed in an integrated circuit manufacturing system, causes the integrated circuit manufacturing system to manufacture an integrated circuit embodying the hardware.

There is provided a computer readable storage medium having stored thereon a computer readable description of hardware as described herein which, when processed in an integrated circuit manufacturing system, causes the integrated circuit manufacturing system to:

process, using a layout processing system, the computer readable description of the hardware so as to generate a circuit layout description of an integrated circuit embodying the hardware; and manufacture, using an integrated circuit generation system, the hardware according to the circuit layout description.

There is provided an integrated circuit manufacturing system configured to manufacture hardware as described herein.

There is provided an integrated circuit manufacturing system comprising:

a non-transitory computer readable storage medium having stored thereon a computer readable description of hardware as described herein;

a layout processing system configured to process the computer readable description so as to generate a circuit layout description of an integrated circuit embodying the hardware; and an integrated circuit generation system configured to manufacture the hardware according to the circuit layout description.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

In the examples provided herein, the invention is described as embodied in a Convolutional Neural Network (CNN). A Convolutional Neural Network is a type of Deep Neural Network (DNN) in which a convolution operation is applied at one or more layers of the network. It will be appreciated that the invention is not limited to use in a Convolutional Neural Network and may be used in any kind of Deep Neural Network.

Figure 1:
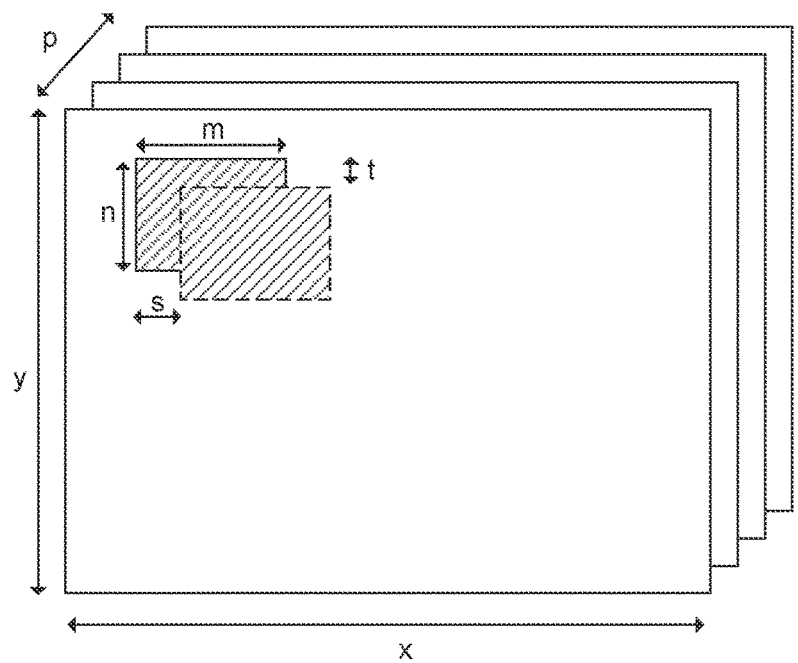
FIG. 1 shows an example of the structure of data used in a Convolutional Neural Network.

An example overview of the format of data utilised in a CNN is illustrated in FIG. 1. As can be seen in FIG. 1, the format of data used in a CNN may be formed of a plurality of planes. The input data may be arranged as P planes of data, where each plane has a dimension x×y. The CNN comprises a plurality of layers each of which has associated therewith a plurality of filters $w_0 \ldots w_n$. The filters $w_0 \ldots w_n$ each have a dimension m×n×P and are be applied to the input data according to a convolution operation across a number of steps in direction s and t, as illustrated in FIG. 1.

As mentioned above, each layer may have associated therewith a plurality of filters $w_0 \ldots w_n$. As used herein, the weights may also be referred to as filters, filter weights, or coefficients. The number and value of filter weights may vary between layers such that for a first layer, the number of weights may be defined as $w_0^1 \ldots w_{n1}^1$ and for a second layer, the number of weights may be defined as $w_0^2 \ldots w_{n2}^2$, where the number of weights in the first layer is n1 and the number of weights in the second layer is n2.

Figure 2:
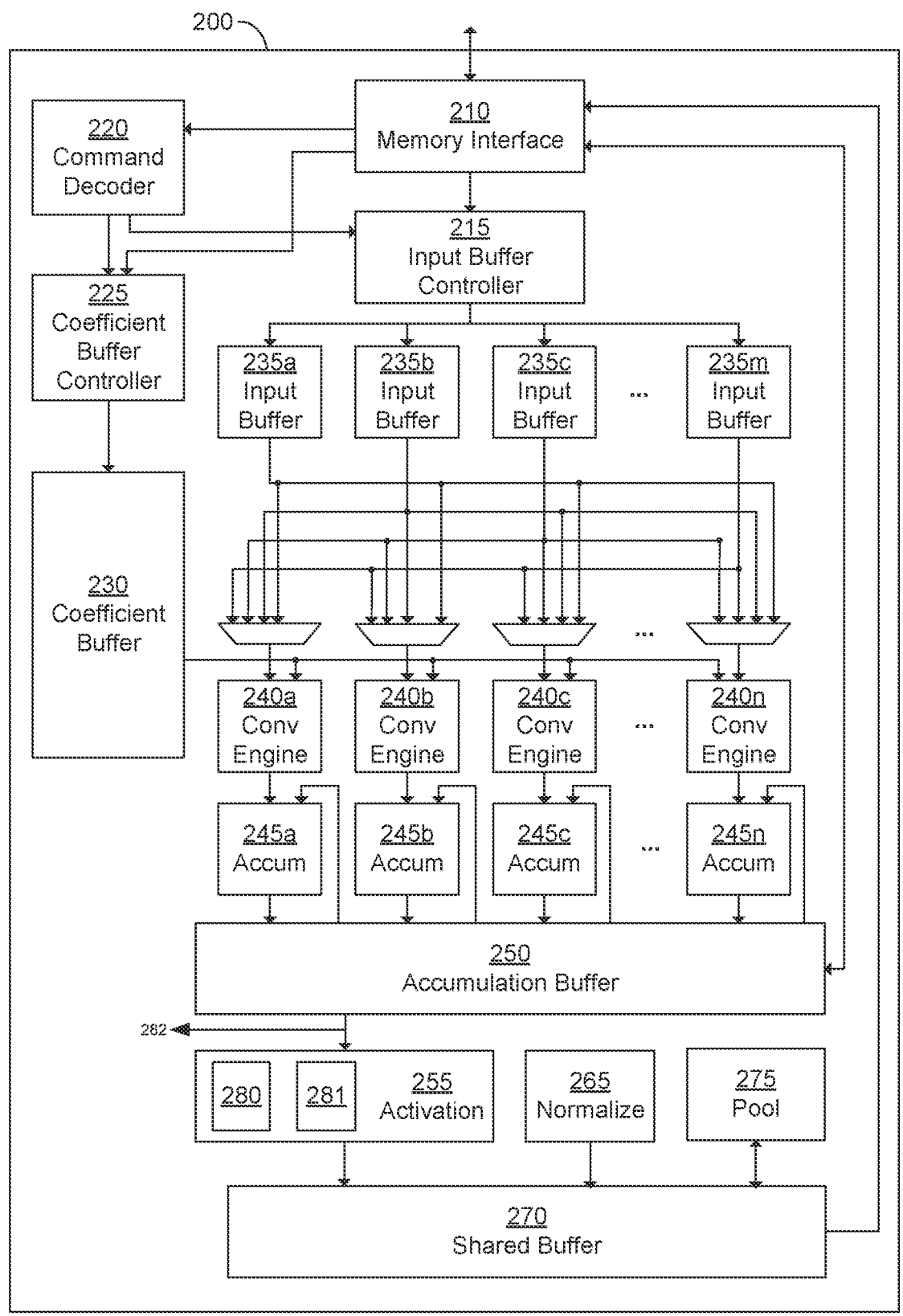
FIG. 2 shows an exemplary hardware implementation of a Convolutional Neural Network.

For a plurality of layers of the CNN, the input data for that layer is processed by convolving the input data for that layer using the weights associated with that layer. For a first layer, the 'input data' can be considered to be the initial input to the CNN, which may in some examples be an image—for example where the CNN is being utilised for vision applications. The first layer processes the input data and generates a first set of intermediate data that is passed to the second layer. The first set of intermediate data may also take the form of a number of planes of data. The first set of intermediate data can be considered to form the input data for the second layer which processes the first intermediate data to produce output data in the form of second intermediate data. Where the CNN contains a third layer, the third layer receives the second intermediate data as input data and processes that data to produce third intermediate data as output data. Therefore reference herein to input data may be interpreted to include reference to input data for any layer. For example, the term input data may refer to intermediate data which is an output of a particular layer and an input to a subsequent layer. This is repeated until the final layer produces output data that can be considered to be the output of the CNN. FIG. 2 illustrates an exemplary hardware implementation 200 configured to implement a CNN. FIG. 2 shows just one example of hardware for use with the present invention: in general, the present invention may be used with any configuration of hardware suitable for implementing a CNN or, more generally, any kind of Deep Neural Network.

The hardware implementation shown in FIG. 2 comprises digital logic circuitry that is configured to receive data (e.g. configuration data) that defines the CNN to be implemented and is configured to operate, in accordance with that data definition to process input data so as to implement the CNN. The hardware implementation may therefore be considered to be configurable hardware for implementing one or more CNNs. In this way, reference herein to a hardware implementation of a CNN is reference to hardware that is configured to implement a CNN by operating on input data in accordance with received configuration data. The hardware implementation itself is not necessarily configured to implement a specific CNN and is not necessarily pre-loaded with specific configuration data for the CNN. For example, the CNN does not need to include pre-loaded (or hard-coded) weight data and layer definitions. The hardware implementation is therefore configured to implement any CNN based on the configuration data it receives. As such, the configuration data (also referred to herein as command data) defines the specific CNN to be implemented, including the number of layers to be included and the size and values of weight data, as well as the expected format of input data.

The data that defines the CNN and how the CNN is to be processed may comprise configuration (or command) data, weight data, and input data. The hardware implementation is therefore configured to process the input data using the weight data in order to perform the operations defined by the CNN. The hardware implementation 200 comprises a memory interface 210, an input buffer controller 215, a command decoder 220, a coefficient buffer controller 225, a coefficient buffer 230, n convolution engines 240, n accumulators 245, an activation module 255, a normalize module 265, a shared buffer 270, and a pool module 275.

The memory interface 210 is configured to provide an interface between the hardware implementation 200 and external memory (not shown). The external memory may be considered as a separate module to the hardware implementation 200 or may be considered to be integrated with the hardware 200. The command or configuration data may, for example, comprise information regarding the size and/or format of the weight data and input data size and format as well as their location in the external memory.

The memory interface 210 is configured to receive, from external memory, weights and data to be used in calculations within the CNN, as well as command information to control the operation of the hardware implementation 200. The received weights (also referred to herein as coefficients) are passed to the coefficient buffer controller 225 and the received data is passed to the input buffer controller 215. The received commands are passed to the command decoder 220, which, in turn, is configured to decode the commands and subsequently issue control information to elements of the hardware implementation, including the coefficient control buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory. Weights and data may be read from memory in any number of reads. Weights and data may be read from memory into respective buffers 230 and 235 at the start of a hardware pass. A read from memory may be a burst read.

Figure 3:
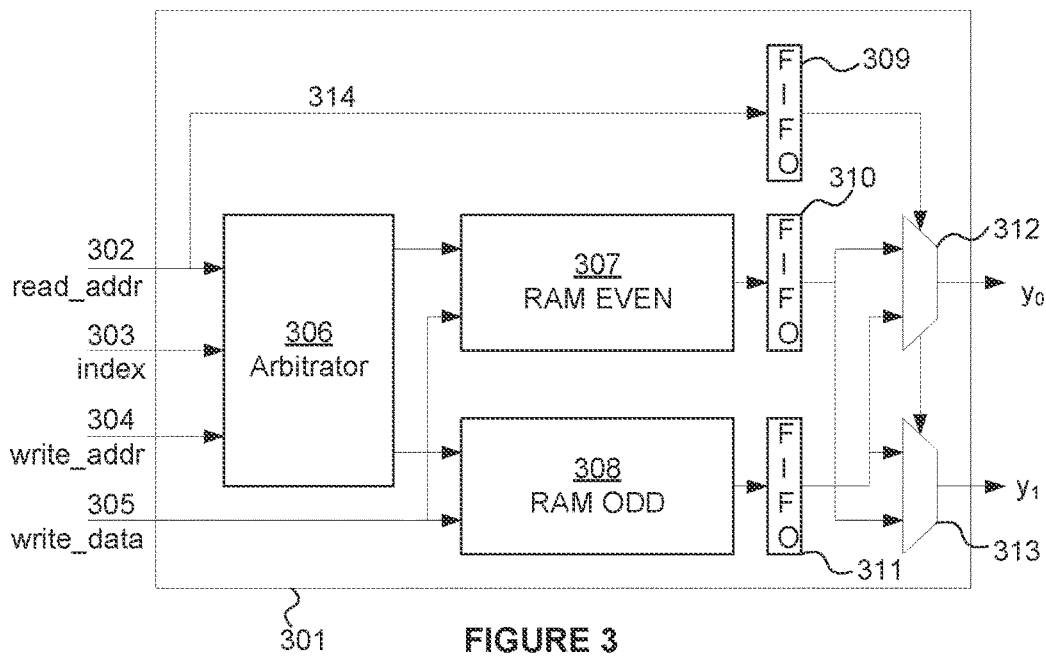
FIG. 3 shows a lookup table for use in the activation module illustrated in FIG. 2.

In practice, the maximum number of weights and data values received from external memory may depend, respectively, on the size of the coefficient buffer 230 and the input buffer 235. For a given hardware pass, the number of filters to be operated on windows (and hence the number of weights and data values to be maintained at the buffers 230 and 235) may depend on how processing of the respective network layer has been split over multiple hardware passes. The weights are passed from the coefficient buffer controller 225 to the coefficient buffer 230 and the data received is passed from the input buffer controller 215 to a plurality of input buffers 235a-235m. The input buffers are shown schematically in FIG. 2 and may be provided in any suitable manner, including as a single input buffer module comprising multiple memories (e.g. RAM banks) arranged to provide the m sets of input data. The number of input buffers will depend upon the specific implementation of the hardware 200 and may take any value. The number of input buffers 235 may differ from the number of convolution engines 240—e.g. fewer input buffers might be provided than the number of convolution engines where multiple convolution engines are arranged to operate on the same window data. The input buffers 235a-235m are connected to each of a plurality of multiplexers since each convolution engine 240a-240n requires access to all of effective 'banks' of the input data. In some examples n=m such that the number of input buffers is the same as the number of convolution engines, but in other examples, n≠m. Generally, the number of input buffers 235 can be varied independently of the number of convolution engines 240. The multiplexers are each configured to select an output from one of the input buffers and to pass the values output from the selected input buffer to a respective convolution engine 240a-240n. In addition, weights from the coefficient buffer 230 are provided as a second input into each convolution engine 240a-240n. The convolution engines are configured to perform a convolution operation on the received input data using the weights received from the coefficient buffer 230. The resultant output of each convolution engine 240a-240n is provided as an input to a respective accumulator of a plurality of accumulators 245a-245n. An example implementation of a convolution engine 240n is illustrated in FIG. 3, which comprises a plurality of elements of multiply logic 310 and a plurality of elements of addition logic 320.

Each accumulator 245a-245n is connected to an accumulation buffer 250 (in FIG. 2 a single accumulation buffer is shown but in general there may be any number of buffers provided at any number of underlying data stores). The accumulation buffer 250 is configured to store accumulated results received from each accumulator 245a-245n. In some cases, an accumulator may provide a partial accumulation and not a final result of a convolution operation. For example, where a filter is larger than the coefficient buffer the convolution operation (comprising operating a filter on a window) can be split over multiple hardware passes. A partial accumulation may be passed forward for use at a subsequent hardware pass such that over multiple passes a final accumulation result may be formed.

The accumulation buffer 250 may be connected to the memory interface 210. The accumulation buffer 250 may be configured to send and receive data to and from external memory via memory interface 210. The accumulation buffer 250 may be configured to be able to store and read-back values at the external memory via memory interface 210, as will be described in more detail below. The accumulation buffer 250 may be connected to the input of the accumulators 245a-245n so as to allow partial accumulations to be fed back into the accumulators 245a-245n for accumulation with subsequent partial accumulations performed at the convolution engines.

The accumulation buffer 250 is configured to pass accumulated values to the activation module 255. The activation module 255 is configured to perform at least one of a number of different activation functions. Activation functions are performed in all kinds of Deep Neural Networks. In the example shown in FIG. 2 the activation function performed by the activation module 255 forms part of the implementation of a CNN.

Figure 4A:
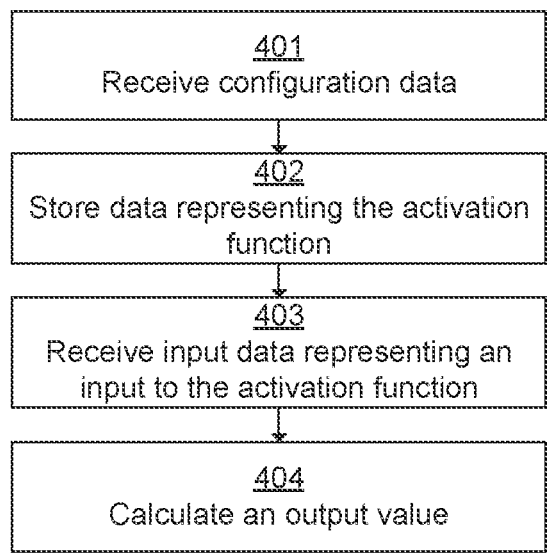
FIG. 4a shows an example method for operating an activation module.

In use when a CNN is implemented at the hardware implementation 200, the activation module is configured to perform a method as illustrated in FIG. 4a. The activation module may be configured to implement one or more user-defined activation functions. The activation module may be configured to receive at step 401 configuration data that specifies one or more properties of an activation function to be applied to input data. The configuration data can be used to specify, for example, one or more data points of the activation function, one or more characteristics of the activation function, or more or more values that can be used to derive or identify a particular activation function to be implemented in the activation module 255 for one or more passes of the activation function.

During configuration, the activation module 255 may be configured to store at step 402, in entries of a lookup table, data representing an activation function based on the received configuration data. In some examples, the data representing the activation function may be the received configuration data. In some arrangements, where the configuration data comprises data points of the activation function, the data points may themselves be stored in the lookup table. In some arrangements, the configuration data may be used to identify a pre-stored activation function so that data representing that identified activation function (such as data representing the data points of that pre-stored activation function) can be loaded into the lookup table—for example using an identifier in the configuration data. The values in the lookup table may represent an estimate or approximation of the activation function. The data stored in the lookup table may be gradient and offset values of at least a portion of the activation function.

In this manner, an activation module may be configured to perform an activation function appropriate to the activation layer of the CNN for a given hardware pass. Because the lookup table is programmable, the activation function may change from one hardware pass to the next.

Following configuration of the activation module at step 402, in use in the CNN the activation module 255 receives at step 403 input data representing an input to the activation function. The activation module may be configured to read one or more entries from the lookup table based on at least a portion of the received input. In some arrangements, the activation module 255 is configured to use at least a portion of the received input as an address into the lookup table. For example, a pre-defined number of values may be stored in the lookup table and the value of the received input may be the value used as an address into the lookup table. For example, the address to be used may be determined from a pre-defined number of MSBs of the input data.

The activation module is configured to calculate, at step 404, an output value representing the output of the activation function based on the one or more entries read from the lookup table. The activation module may calculate the output value further based on at least a portion of the input data, for example a pre-defined number of LSBs of the input data. The portion of the input data used to lookup one or more entries in the lookup table may be different from the portion of the input data used to calculate the output value. The activation module may calculate the output value by interpolating between two or more entries read from the lookup table.

The configuration data provided to the activation module may comprise one or more of data points representing the activation function, data representing the shape of the function, or an identifier of a pre-defined function to be implemented so as to allow the activation module to load that function from a data store.

The hardware implementation 200 may further comprise a normalize module 265 and a pool module 275 configured to share data via shared buffer 270 which receives the output of the activation module 255. The normalize module may be configured to perform one or more normalization functions on the data in the shared buffer. The pool module may be configured to perform one of more pooling functions on the data in the shared buffer—for example, max or mean calculations performed within a sliding window defined for each layer of the CNN.

A result stored in the shared buffer 270 is passed to the memory interface 210, which can either store the result in external memory or pass the result back into the input buffers for further processing without having to first be passed out to external memory.

The shared buffer 270 allows the values output by the activation module to be buffered until the correct samples are available to perform normalisation and/or pooling. Used in this way, a shared buffer provides efficiency of storage since, in many implementations, the normalisation and pooling are not combined in the same process. Furthermore, the use of a shared buffer allows the order in which normalisation and pooling is performed to be adapted to the CNN being implemented at the hardware 200. Additionally, by providing shared buffer 270, the activation, normalization and pooling functions may be performed back-to-back without having to retrieve data from external memory.

Lookup Table

The configuration and use of a lookup table at the activation module 255 will now be described in more detail. The present teaching applies to any hardware arranged to perform an activation function in a DNN and which uses a lookup table to represent the activation function being performed.

The activation module 255 may be programmed with a specific function that is to be performed in a given hardware pass of an implementation of a CNN. The function to be implemented in the activation module (i.e. the activation function) can be considered to be a transfer function. The activation module 255 comprises a lookup table which comprises data representing the activation function. By modifying the data at the lookup table (e.g. according to configuration data provided to the activation module), the activation function performed by the activation module can be modified.

Figure 4B:
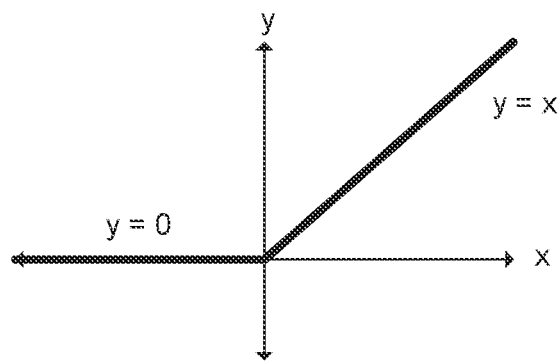
FIG. 4b shows a Rectified Linear Unit (ReLU) function that may be implemented in an activation module.
Figure 4C:
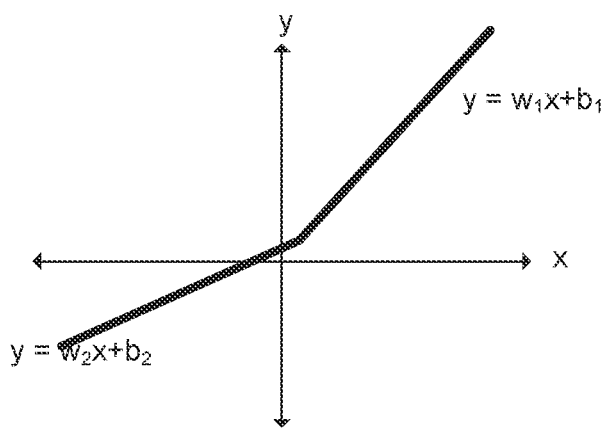
FIG. 4c shows a Parametric Rectified Linear Unit (PReLU) function that may be implemented in an activation module.
Figure 5A:
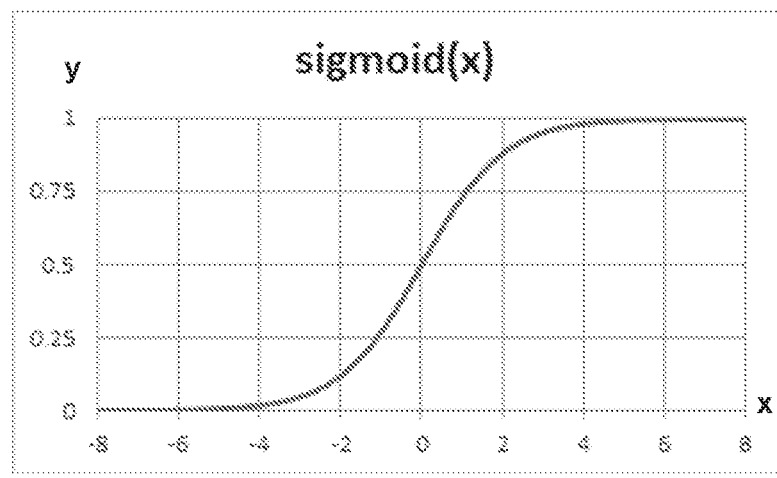
FIG. 5a shows a sigmoid activation function that may be implemented in an activation module.
Figure 5B:
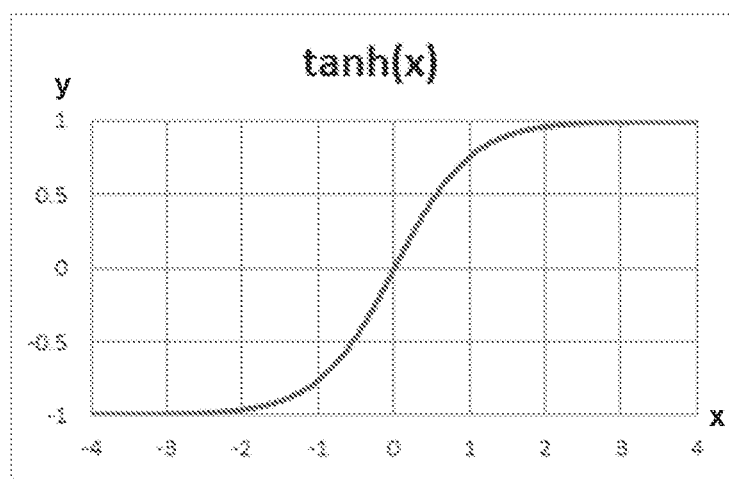
FIG. 5b shows a tanh activation function that may be implemented in an activation module.

Activation functions in DNNs are generally non-linear. Commonly used activation functions used include sigmoid functions, such as the function illustrated in FIG. 5a, tanh, illustrated in FIG. 5b, and a parametric rectified linear function shown in FIG. 4c. In the case that the activation function is a parametric rectified linear function, the activation module may be termed a Parametric Rectified Linear Function (PReLU). A PReLU is configured to generate an output element $y_{i,j,k}$ as set out below:

$$y_{i,j,k}=f(x_{i,j,k};w_1,w_2,b_1,b_2)=\max\{(w_1*x_{i,j,k}+b_1),(w_2x_{i,j,k}+b_2)\}$$

where $w_1$, $w_2$, $b_1$, $b_2 \in \mathbb{R}$ are constants.

A lookup table of an activation module is configured to hold a dataset representing an activation function such that input values to the activation module (or values derived from those values) may be looked up in the table so as to identify the corresponding output values. For example, in FIGS. 5a and 5b, an input value x is used as a lookup into the table, with the output being the corresponding y value on the curve according to the representation of the curve stored in the lookup table. In some implementations, not all possible values of x and y will be defined in the data stored at the lookup table and therefore an interpolation scheme will be required in order to enable an output y to be determined from data stored at the lookup table for any value of x.

In a first approach to representing the activation function which will be described with reference to FIG. 4d, the entries in the lookup table can be formed of at least one gradient and at least one offset. For example, the data received may represent gradient and offset pairs. In this way, the activation module 255 can implement an activation function at a lookup table as a set of value and slope pairs. An interpolation method, such as linear interpolation, may be used to derive intermediate values not held in the lookup table.

An input value (for example from the accumulation buffer) can be used as an address into the lookup table. The lookup table may contain values for the sample C and the gradient m corresponding to points defined by the MSBs. Thus, the lookup table defines multiple data points on (or close to) the curve representing the activation function and a gradient representing a gradient of the curve at (or close to) the defined data point. In order to minimise the overall error over the set of points derivable from a given pair of C and m values, it can be advantageous to store at the lookup table samples C which do not exactly lie on the curve, and gradients m which do not exactly represent the slope of the curve at the defined data point. Suitable values of C and m may be calculated for a given segment of the curve which those values represent so as to minimise the overall error over the segment. A segment may be a portion of the curve representing an activation function between two data points stored at the lookup table.

In one example, where the lookup table is a 64 or 65 entry table, the 6 most significant bits (MSBs) of the input may be used as the address into the lookup table. In another example, the lookup table could be a 256 or 257 entry table indexed by the 8 MSBs of the input. The lookup table may contain values for the sample C and the gradient m at the point defined by the MSBs. The remaining least significant bits (LSBs) of the input may be interpreted as a value between 0 and 1, such that the output of the activation module is defined by:

$$y=m*(\text{LSBs})+C$$

Figure 4D:
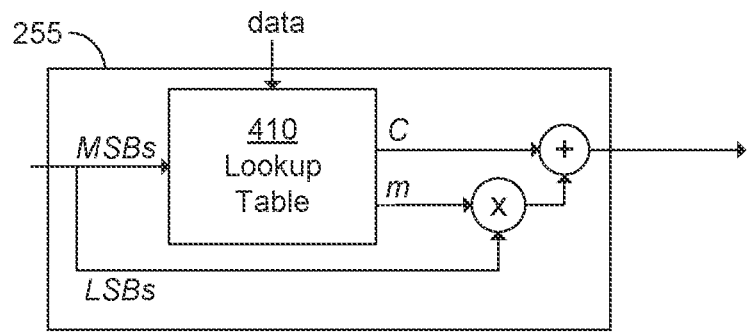
FIG. 4d shows an exemplary hardware implementation of an activation module illustrated in FIG. 2.

An exemplary hardware implementation of the activation module 255 of the first approach is illustrated in FIG. 4d. Activation module 255 includes a lookup table that is configured to store values which represent the activation function implemented at the activation module 255. The activation module 255 further comprises multiplication logic and addition logic in order to perform the calculation defined above. The MSBs of an input value are used as an address into the lookup table and the corresponding m and C values are read from the lookup table and output. The remaining LSBs of the input value are then multiplied with the lookup table output m, the result of which is then added to the lookup table output C.

Figure 4E:
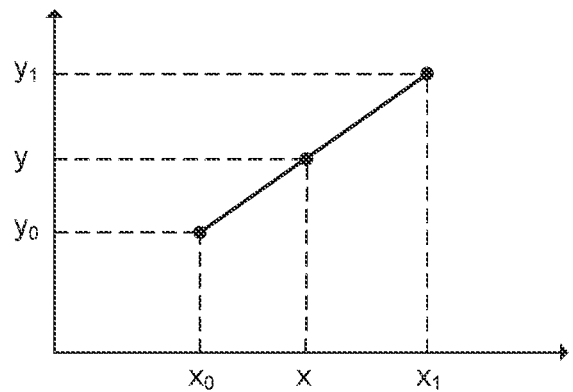
FIG. 4e shows an example of an interpolation performed in an activation module of FIG. 4f.

In a second approach, instead of storing in the lookup table m and C values which are then retrieved, two different coarse output values are determined which are located either side of the input value. The output value to be output from the activation module is determined by interpolating between the two coarse output values based on at least a portion of the input value as described below with reference to FIGS. 4e and 4f. This approach may involve storing in the lookup table a set of discrete output values. Using the example described above in which 6 MSBs of the input are used as an address into the lookup table, there can be 65 different output values in the lookup table for the activation function. Providing one more entry at the lookup table than is addressable by the MSBs of the input value used as an index into the lookup table (e.g. 65 in the above example rather than 64) allows 64 spans between entries to be defined. For example, values within the $64^{th}$ span can be determined by interpolating between the $64^{th}$ and $65^{th}$ entries. When an input value is received at the activation module, the six MSBs of the input value may be used as an address to lookup a corresponding output value in the lookup table. In addition, the output value at the next address location in the lookup table may also be retrieved. In this manner, the output values of the data points stored in the lookup table which are adjacent either side of the input point are identified.

Figure 4F:
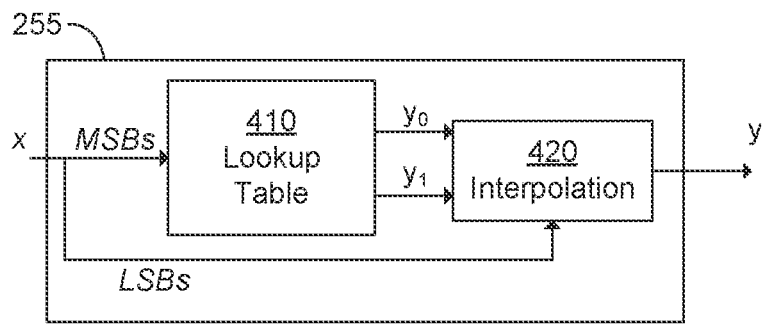
FIG. 4f shows another exemplary hardware implementation of an activation module illustrated in FIG. 2.

As illustrated in FIG. 4f, the MSBs of the input value correspond with input value $x_0$ and the next corresponding input value is $x_1$. Accordingly, the two values retrieved are the corresponding output values for the identified input values, namely $y_0$ and $y_1$. From the retrieved output values $y_0$ and $y_1$, the LSBs are used to identify the position of the input value x between $x_0$ and $x_1$ so as to permit interpolation between the output values $y_0$ and $y_1$ to determine the corresponding output value y. Any suitable interpolation algorithm may be used.

FIG. 4f illustrates an example hardware arrangement configured to perform a first interpolation approach. In this arrangement the activation module 255 comprises a lookup table 410 configured to store output values corresponding to a predefined set of corresponding input values. The activation module 255 further comprises an interpolation module 420 configured to perform an interpolation operation to calculate y. This interpolation may be a linear interpolation achieved according to the following equation:

$$y = y_0 + (y_1 - y_0)\frac{x - x_0}{x_1 - x_0}$$

In which:
$x_0$=MSBs of x
$x_1$=MSBs of x+1
$y_0$=LUT($x_0$) (i.e. output value retrieved from lookup table for input value $x_0$)
$y_1$=LUT($x_1$)
$x-x_0$=LSBs of x
$x_1-x_0$=known interval in x between data points in the lookup table In some implementations the interval may be variable such that a greater number of data points are provided where the underlying activation function is changing more quickly. If the interval is fixed, there is the advantage that the value of $x_1-x_0$ is represented by the value of 1 left-shifted by the number of most significant bits used as a lookup into the lookup table. This allows the above equation to be more simply implemented in hardware as follows:

$$y=y_0+(((y_1-y_0)*\text{LSBs})\gg\text{number of MSBs})$$

As illustrated in FIG. 4f, the activation module 255 is configured to receive an input value x. A pre-defined number of n MSBs (which corresponds to $2^n$ entries in the lookup table) is used as an address into the lookup table to retrieve an output value $y_0$ at a corresponding address in the lookup table as well as the next output value in the lookup table, $y_1$. These two values $y_0$ and $y_1$ are output from the lookup table 410 and input in the interpolation module 420, which performs an interpolation based on the remaining LSBs of the input value x to determine y. The interpolation module 420 then outputs the output value y that corresponds with the input value x.

Figure 4G:
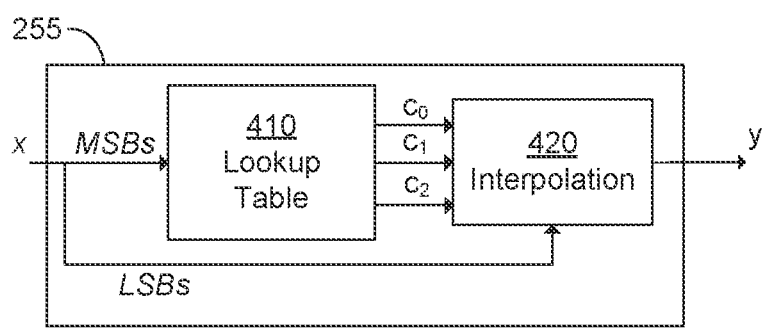
FIG. 4g shows another exemplary hardware implementation of an activation module illustrated in FIG. 2.

A further hardware implementation of the activation module 255 is illustrated in FIG. 4g for performing a quadratic interpolation between data points stored at the lookup table. In the arrangement of FIG. 4g, the lookup table is configured to retrieve three output values, namely $c_0$, $c_1$, and $c_2$ based on the MSBs of the input value x. This enables, for example, a quadratic interpolation to be performed by the interpolation module 420. In this way, more complex curves can be interpolated by retrieving from the lookup table 410 more coefficients. It will be appreciated that more than three values can be retrieved and used to interpolate an output value for the input value.

Other interpolation schemes may be used.

By writing different data points to the lookup tables 410 shown in FIGS. 4f and 4g, different activation functions can be represented in the lookup tables and hence performed by the activation modules. The use of a lookup table therefore enables the specific activation function to be performed by the activation module 255 to be configurable at run time. This would not be the case for fixed function hardware configured to perform the activation function on data incoming to the activation module, and using a lookup table consumes substantially less chip area and power than would programmable logic configured to implement an activation function. Typically, the accuracy of the output of an activation module with respect to the underlying activation function represented at the lookup table increases with the number of data points stored at the lookup table. However, storing a larger number of data points increases the size of the lookup table. For a given hardware implementation, a reasonable trade-off can be established between accuracy and area consumption. In the exemplary hardware shown in FIG. 2 for implementing a CNN, a lookup table configured to store around 256 data points has been found to offer a good balance of characteristics in a system in which the activation layer operates on 16 bit data.

An exemplary architecture for a lookup table 301 is shown in FIG. 3. The architecture shown is in particular for use in the arrangement of FIG. 4f where two adjacent entries are looked up in the lookup table. The lookup table 301 comprises two data stores 307 and 308. The data stores may be single port synchronous random access memories (RAMs). Data store 307 is arranged to store even entries representing a set of data points defining an activation function; data store 308 is arranged to store odd entries representing a set of data points defining an activation function. For example, when numbering entries from 0 (e.g. from 0 to 64 to provide 65 entries), for a lookup address N bits in length the odd data store may comprise $$\frac{2^N}{2}$$

odd-numbered entries and the even data store may comprise $$\frac{2^N}{2}+1$$

even-numbered entries. This arrangement allows odd and even entries to be read simultaneously. The even and odd entries together represent the complete set of data points stored at the lookup table. An arbitrator 306 is configured to arbitrate between incoming read 302 and write 304 addresses to the lookup table.

A read address 302 representing an address of an entry in the lookup table may comprise a predefined number of the most significant bits of an input value x. In other implementations, a read address may be derived from an input value x in any other manner, at the arbitrator 306 or at another unit. The greater the number of MSBs used, the larger the address space and the greater the number of possible entries in the lookup table. The choice as to how many MSBs to use as an index and the number of LSBs to use for interpolation can be made so as to trade off accuracy against lookup table size. For example, for an activation module operating at 16 bits, using the first 6 MSBs as the lookup address can be used to provide around 64 entries in each of the data stores 307 and 308. The remaining 10 LSBs may be used to interpolate between the outputs provided by the lookup table. In some implementations, the translation of input data into addresses in the lookup table may be performed at a unit outside the arbitrator.

A write address 304 may comprise the address of an entry in the lookup table which is to be updated, with the data values to be written into the data stores 307 and 308 being provided over lookup table input 305.

The lookup table 301 may be provided at an activation module in hardware configured to process layers of a deep neural network in passes. Depending on the capabilities of the hardware, each pass may perform one or more different layers (e.g. convolutional layers, activation layers, normalization layers, etc.). On each pass through an activation layer, the one or more activation modules tasked with processing that layer are configured to perform the activation functions loaded into the lookup tables of those activation modules. The lookup tables may be updated before each pass through the activation layer so as to enable a different set of activation functions to be performed at each pass. In order to avoid delaying processing whilst the lookup tables are updated, it is advantageous if the values required for the next pass are written into the lookup tables while the values for the current pass are being used. This may be achieved, for example, through the provision of multiple lookup tables at an activation module or by providing multiple data sets at the lookup table of an activation module.

In the example shown in FIG. 3, each of the data stores 307 and 308 contains two complete sets of data such that one of the sets can be updated whilst the other set is being used in a pass of the activation layer. Index 303 is used to indicate to the arbitrator which of the two sets of entries at the data stores 307 and 308 is to be used in a given pass. Writes may be made to the set of entries in the data stores which are not being used in the current hardware pass. The index may be updated in any suitable manner—for example, at the lookup table or activation module itself. As each pass of the activation layer is made the index may be updated so as to alternate between the two sets of data at the lookup table of each activation module. It may not be necessary to load a new table on each hardware pass—for example, if the activation function is the same then it is not necessary to load a new lookup table. The index may be configurable for each pass so as to indicate which of the two sets of entries at the lookup table should be used. On a new activation function being required for a next hardware pass, a new set of entries may be written to the data store not currently in use and the index updated on configuring that next hardware pass so as to cause the lookup table to use the data store to which the new entries have been written. The writing of new entries into the lookup table and the index for each pass is performed according to the definition of the neural network being performed and may be achieved at hardware 200 by providing an appropriate command stream to command decoder 220.

The arbitrator may be configured to give priority to read addresses 302 over write addresses 304 so as to avoid latency being introduced into the operation of the neural network whilst new data is being written into the lookup table. This enables writes to be performed in the gaps between reads relating to neural network processing being performed.

Write data 305 provided to the lookup table may comprise values in a form suitable for writing directly into the entries of the lookup table. The activation module 255 may be configured to receive the lookup values from the command decoder 220 which may be arranged to receive the values of the function from external memory via the memory interface 210. The activation module 255 may be configured to receive a different set of values to be stored in the activation layer for each hardware pass. In some configurations, a DNN may comprise multiple activation layers. In the hardware 200 implementing a CNN, the command decoder 220 may be configured to receive values defining functions that are to be used for one or more activation layers of the CNN in a single hardware pass.

A read address 302 may be interpreted by the arbitrator 306 (or another unit) as a pair of addresses: a first address representing a lookup into the even entries of the data store 307, and a second address representing a lookup into the odd entries of the data store 308. It can be advantageous to configured the data stores such that, when the read address read_addr is even, both data stores read from the same address, and when the read address read_addr is odd, one data store reads from an address at read_addr+1 (or −1), or vice versa. In other implementations, a pair of addresses could be used which differ by a number of bits other than 1. Whether or not the read address is odd and even is identified by the least significant bit of the address: e.g. if read_addr[0]=0 then it is even, otherwise it is odd.

The outputs from the data stores may be provided to multiplexers 312 and 313 which select the appropriate outputs $y_0$ and $y_1$ according to whether or not the read address is odd or even. For example, in the case described above, if the read address is even then the output of the even data store 307 is used as $y_1$ and the output of the odd data store 308 is used as $y_0$, otherwise the output of the even data store 307 is used as $y_0$ and the output of the odd data store 308 is used as $y_1$. Signal 314 indicates the parity of the read address and provides a control signal to the multiplexers 312 and 313—for example, it may be the least significant bit of the read address, read_addr[0]. This approach ensures that output $y_0$ is always smaller than output $y_1$ which simplifies the interpolation between those values since the above equation may be applied directly to the outputs. In other implementations the output values $y_0$ and $y_1$ may be in any particular order.

Signal 314 may be pipelined so as to align it with the outputs read from the data stores 307 and 308.

To avoid stalling issues, FIFO buffers may be provided at the output of the data stores (FIFOs 310, 311) and in parallel with the data stores on the data path of signal 314 (FIFO 309). FIFO 309 may be configured to match the pipeline length of the address with the path through the RAMs 307 and 308, and FIFOs 310 and 311 may be configured to handle a fixed latency of 2 cycles at the RAMs 307 and 308. This enables the lookup table to be stalled back as a normal pipeline. Each of the FIFOs may have a depth of 2 entries.

It will be appreciated that the above approach can be extended to activation modules comprising more than two lookup tables (e.g. where it is advantageous to read more than two values simultaneously—for instance, if the activation function was a surface in more than two dimensions).

The inputs to the activation layer in a DNN may in principle take any value in the range permitted by the bit length of the inputs. However, in practice for a particular implementation of a DNN, the input values to the activation layer may take only a subset of the possible range of input values. This leads to portions of the lookup table being unused which is an inefficient use of chip area. By arranging that the full range of entries in the lookup table can be used, the effective accuracy of the activation function performed using the lookup table can be improved and the inefficient use of the storage space in the lookup table can be largely eliminated.

During training of a DNN, weights, activation functions and other parameters (e.g. an offset, min/max clamping values) of the system are determined for the layers of the neural network. This is typically performed by means of training software running at a data processing system (e.g. 600 in FIG. 6) which comprises hardware configured to implement the DNN (e.g. hardware 200 in FIG. 2). In some cases, the hardware may be simulated in software with the training software being arranged to operate on the hardware simulation so as to establish configuration parameters for use at the hardware itself. Generally speaking, the training software will provide a test dataset to the DNN and iteratively modify the parameters of the DNN so as to optimise its performance. For example, in the case that a DNN is configured to perform object recognition in an image, a set of activation functions and an initial configuration of the layers of the DNN may be determined by a user. Training software may then be used to provide a dataset of thousands of different images of the object (e.g. a cup) to the DNN whilst introducing small variations into the parameters of the DNN according to some predefined scheme. Generally speaking, changes which improve the performance of the DNN (e.g. its accuracy in identifying a cup in an image) are retained and changes which worsen the performance of the DNN are discarded. In this manner an optimum set of parameters may be defined for the DNN.

It is further advantageous to determine an expected range of input values to an activation layer of the optimised DNN—i.e. the range of input values which are observed being provided to an activation module rather than the possible range of input values permitted by the bit length of input values to the activation module. This can be achieved by performing range calibration at a configuration module. Range calibration may be performed once a DNN has been optimised. Range calibration may be performed by a configuration module causing calibration data to be provided to an activation module (e.g. by providing test data to the DNN for processing) and, during operation of the DNN, monitoring the input values provided to an activation module of the DNN so as to identify a range of the input values.

Range calibration may be performed using a representation of hardware. A representation of hardware 200 may be a representation in any combination of software and/or hardware (e.g. a programmable chip). For example, hardware 200 may be simulated at a data processing system in software and calibration data provided to the hardware simulation and the range of input values to the simulated activation module monitored so as to identify a range of input values. The hardware simulation may be the same hardware simulation used for training the DNN. The range calibration may be performed as part of the training of a DNN—e.g. as a training phase following optimisation of the filter weights and other parameters. Simulating hardware for implementing a DNN may comprise simulating the particular hardware as configured to perform the DNN or simulating the DNN which is to be implemented in hardware. A configuration module configured to provide the calibration data and monitor the resulting input values may be provided in software—e.g. in the training software used to optimise the DNN.

In other examples, a data processing system supporting training software may comprise hardware 200 and the training software may be configured to perform range calibration using the hardware 200 configured to perform a DNN. The DNN implemented at the hardware may be optimised following training performed by the software. The ranges of input values to the activation modules of the hardware when performing different activation functions of a DNN on calibration data may be captured by the training software in order to identify an input range for each activation module when performing each activation function.

In order to provide access to the input values to an activation module, the hardware implementing a DNN (or its representation—e.g. a simulation in software of the hardware) may be configured to copy the input data to the activation module onto a data path for consumption by entity configuration module (e.g. the training software) which is to monitor the input values and form an expected input range for the activation module. For example, a copy of the input data to the activation module could be streamed into a memory accessible to the monitoring entity. In the particular example shown in FIG. 2, the output from the accumulation buffer 250 (which represents the input to the accumulation module 255) may be directed over data path 282. By means of memory interface 210, data path 282 could direct the input data into a memory of a data processing system (see 600 in FIG. 6) comprising hardware 200 for consumption by monitoring software running at that data processing system. The data path 282 could be turned off once configuration of the DNN is complete. The data path 282 may be used only during range calibration of the DNN or other training phases. In other examples, a configuration module provided to determine the range of input values to an activation module during its operation may be fixed or programmable hardware.

One approach to determining the range of input values at the activation layer is to capture the maximum and minimum input values in the stream of input values provided to the activation module. The determined range of input values may then be set for the activation module as equal to or approximately equal to the range of values between those captured maximum and minimum values. In other examples, the stream of input values may be processed so as to form a probability distribution or histogram representing the likelihood of occurrence of each input value. For many applications, such a probability distribution would be approximately normally distributed or, if the probability distribution is not symmetric, a skewed normal distribution. The determined range of input values may be set for the activation module based on the probability distribution. For example, the determined range may be set as the range of input values which cover 90%, 95%, 98%, 99% or 99.5% of the input values according to the probability distribution with the minimum and maximum values being symmetrical about a mean of the distribution, or at input values corresponding to points of equivalent probability on the probability distribution curve. In another example, the determined range may be set as the range of input values whose maximum and minimum endpoints are defined as being the input values at or around which the probability distribution falls below some predefined or programmable level (e.g. 1%, 0.5%, 0.25%, 0.15%, 0.05%, or 0.005%). It will be appreciated that many variations are possible. A configuration module may be configured to determine the range of input values.

Since range calibration may be performed as a further training phase prior to use of the DNN, it is generally of no consequence if monitoring the input values to an activation module introduces latencies into the system (e.g. due to the data stream 282 being provided back to a memory via memory interface 210). Furthermore, if appropriate, substantial and potentially time-consuming processing may be performed on the input data at a data processing system (e.g. 600 in FIG. 6) in order to identify optimum range values for the activation modules of hardware for implementing a DNN (e.g. hardware 200).

Figure 6:
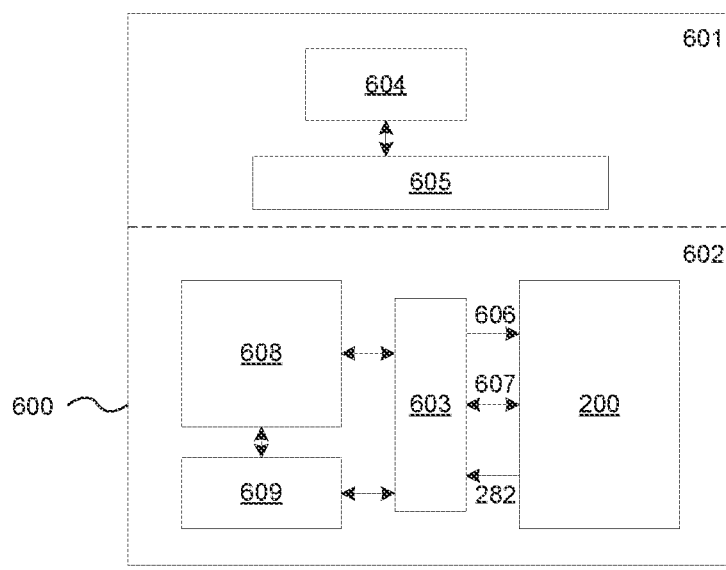
FIG. 6 is a schematic diagram of a data processing system comprising the hardware implementation of FIG. 2.

An exemplary arrangement of the hardware 200 of FIG. 2 at a data processing system 600 (e.g. a computer system such as a server, laptop or smartphone) is shown in FIG. 6. The data processing system comprises at least one processor 608 for supporting a software environment 601 that comprises an operating system 605 and training software 604. In hardware 602, along with the processor 608, there may be provided a memory 609 for storing training data, input data for processing at a trained CNN implemented at hardware 200, configuration parameters for the hardware 200, etc. A bus or other interconnect 603 may be provided to connect the processor, memory and hardware 200. The flow of input data 282 for one or more activation modules up to the memory for storage and processing by the training software 604 is shown, along with the flow of input data and the returned processed data 607, and the flow of configuration parameters 606 to the hardware 200.

Once the input range has been determined for an activation module, the calibration module (e.g. training software 604) is configured to calculate appropriate lookup data (e.g. a set of data points) for storage at the lookup table of the activation module. For example, a set of data points defining an activation function may be calculated so as to be evenly spaced over the expected input range of inputs to an activation module which is to be configured to perform that activation function, or the data points may be calculated so as to lie within the determined input range be more closely spaced in areas where the activation function is changing more rapidly than are data points in areas where the activation function is changing less rapidly.

Once determined, the lookup data may be written to a store of configuration data (e.g. in memory 602) for use at the activation module during execution of the DNN when the respective activation function is to be performed at the activation module. For example, during execution of the DNN, on the DNN requiring that the activation function is to be performed at the activation module in question, the lookup data is written to the lookup table of that activation module so as to enable the activation module to perform an approximation of the activation function over the determined input range.

The range calibration may be repeated over all of the activation functions used in a DNN so as to establish optimal lookup data for representing each activation function. Furthermore, as a set of input data is processed at a DNN, the same activation function may be used at the same activation module but in different hardware passes which are performed at different stages of a DNN processing model. The input range of data to an activation module performing the same activation function but at different points in the processing of a DNN can vary between those processing points. It can therefore be advantageous to perform range calibration in respect of each (or at least some of) the instances of an activation function being performed at an activation module during processing of a DNN. In this case, multiple sets of lookup data may be determined for each activation function to be performed at an activation module.

Often the training and range calibration of a hardware implementation 200 will be performed at a different system to that which will ultimately use the trained and calibrated DNN. For example, a first system may be used to train a given hardware implementation of a DNN (e.g. using a representation of the hardware which may be the hardware itself, or a simulation in software or programmable hardware) and, according to the above principles, generate lookup data over a determined input range for the activation modules of the hardware. The lookup data configured to optimally represent the activation function at the lookup table of that activation module may then be provided with the definition of the DNN (e.g. along with its weights and other parameters) for use at a second system comprising the hardware implementation of the DNN. For example, the first system may be a training system operated by a manufacturer of data processing systems (e.g. smartphones) which include the hardware 200, and the second system could be the data processing systems (e.g. smartphones) themselves. In this manner the hardware implementation of the second system is optimally configured to perform activation functions at its activation modules, maximising the performance of the hardware.

Since the input range determined for an activation module is determined in dependence on training data or other data representative of the data the DNN will process at run time, it is possible (if the determined input range is not the full available range given the bit length of the input values) that during use the activation module may in fact receive input values which are outside the determined range. For many functions the value of the activation function outside of the determined range can be approximated by the function value at the bounds of the range. In other words, the activation function could be approximated outside of the determined range by, for input values outside of the determined range, clamping the corresponding output values at the values of the activation function at the bounds of the determined range.

Figure 7:
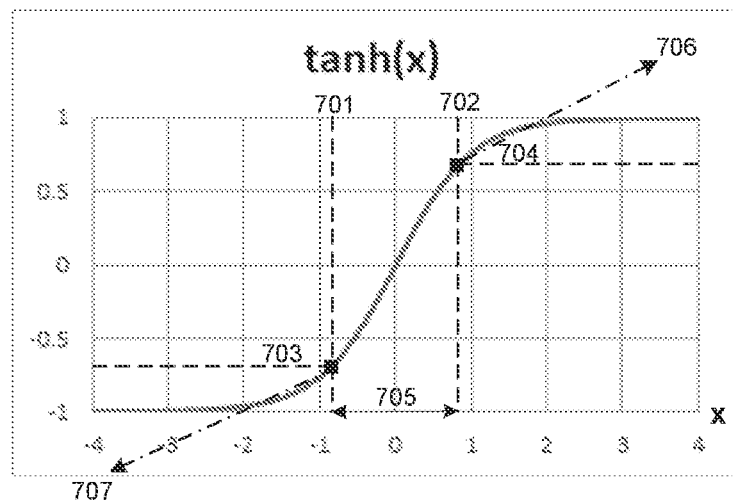
FIG. 7 shows a tanh activation function for which an expected range of input values has been determined.

For example, FIG. 7 illustrates a tanh activation function for which the range of input values has been determined according to the above described approach as range 705 between bounds 701 and 702. Bounds 701 and 702 may or may not be symmetrical about the midpoint of the tanh function x=0. The activation function is clamped for input values outside the determined range at the clamped outputs 703 and 704, which are the output values at the bounds of the determined range 705. The clamping of input values outside of the determined range could be performed by configuring the lookup table to return the output values stored for the input values at the bounds of the determined input range for input values which lie outside the determined input range. In some examples, the clamping of input values outside of the determined range could be performed at other logic and bypass the lookup table (e.g. in the example shown in FIG. 2, at simple path 281 described below). For example, clamp circuitry could be provided to clamp input values lying outside the determined range at the closest boundary input value of the determined range of input values such that the lookup table returns in respect of those values the value of the activation function at that closest boundary input value.

In some examples, exception logic could be provided (e.g. in logic of the activation module associated with the lookup table) to determine when input values lie outside the determined range and, responsive to that determination, cause the activation module to output a clamped value representative of the value of the activation function at the bounds of the determined range. The clamped values could be programmed into the activation module along with the lookup data of the lookup table.

In some examples, such as the example shown in FIG. 7, a better approximation to the activation function outside of the determined input range can be achieved through the use of a line of non-zero gradient—e.g. by extrapolating the gradient of the function at the bounds of the determined range, or identifying a gradient which minimises the error between the bounds of the determined range and the respective maximum/minimum possible input value. In FIG. 7, the activation function is more closely approximated in the region of input values 1 to 2 and −1 to −2 by the lines 706 and 707. At points outside the point where line 706 reaches the maximum value of the activation function (1 in the example shown in FIG. 7), the approximation could be clamped at that maximum value. Likewise for line 707 with respect to the minimum value of the activation function. Alternatively, the gradient of the lines 706, 707 approximating the activation function outside the determined range 705 could be selected such that at the largest possible input value according to the bit length of the input numbers, the approximation of the activation function takes the maximum possible value of the activation function (e.g. 1 for tanh). And likewise for line 707 and the minimum possible value of the activation function.

A straight line approximation of the function outside the determined range could be achieved at logic comprising a multiplier and adder. The gradient and offset of an extrapolation of the activation function may be determined during training—e.g. at training software 604 on determining the range of input values for an activation module. Configuration parameters may be generated during training for writing to an activation module in order to configure its logic to perform a straight line approximation according to the determined gradient and offset.

An activation layer may comprise multiple activation modules operating in parallel. It can be advantageous to independently determine the expected range of input values for each of the activation modules and hence potentially provide different lookup data to the lookup tables of different activation modules performing the same activation function in the same layer. Alternatively, the input ranges determined for each of the activation modules may be combined to form an expected input range for the activation layer as a whole, that input range being applied to all of the activation modules of the activation layer.

The input values on which an activation layer of a DNN operates will typically vary between applications. For example, in one application the activation layer may receive values strictly in the range of 0 to 1, whereas in another application the activation layer may receive values anywhere in the range 192 to 256. In order to minimise the size of the input values stored in the lookup table and to simplify its implementation, it can be advantageous to arrange that a programmable offset is subtracted from the input values to the activation module prior to those input values being looked up in the lookup table. In this manner the input values used as an index to the lookup table can be kept small. For example, in the case that an activation module receives data values in the range 192 to 256, the activation module may be programmed to subtract 224 from each incoming data value so as to form input values for its lookup table which are arranged about 0. A suitable offset can be determined during training for a given activation module (e.g. by software 604 when it determines the input range of values to an activation module) and used to configure the activation module at run time (e.g. it can be provided with other configuration parameters such as the maximum/minimum clamp values and/or lookup data for the lookup table). Adder logic may be provided at the activation module to perform the subtraction of the determined offset.

It will be appreciated that there are other approaches to implementing an activation function using a lookup table which will benefit from the range calibration described herein.

In some implementations, the lookup table and its associated logic may be considered to provide a "complex path" 280 through the activation module. The activation module 255 may additionally comprise a simple path 281 that provides an alternative mechanism for performing an activation function. For example, the simple path may embody a Rectified Linear Unit (ReLU) configured to implement a ReLU function. In a ReLU function, the output element $y_{i,j,k}$ is calculated by identifying a maximum value as set out below and as illustrated in FIG. 4b:

$$y_{i,j,k} = f(x_{i,j,k}) = \max\{0, x_{i,j,k}\}$$

Accordingly, for x values less than 0, y=0. The ReLU function can be said to be clamped for negative input x. A ReLU function may be performed in the conventional manner using a combination of multipliers and adders.

When a hardware pass of a CNN is to be performed which uses the ReLU function implemented on the simple path 281 and not the lookup table 401 and its associated logic implemented on the complex path 280, it can be advantageous to bypass the complex path and to turn off (e.g. stop clocking) the lookup table and its associated logic so as to reduce power consumption. Likewise (although for a lesser benefit) it can be advantageous to turn off the calculation unit when the lookup table is used to perform the activation function. However, when performing an activation function which uses the lookup table of the complex path it can be advantageous to use the simple path to clamp input values to minimum and/or maximum output values outside a predefined or programmed range of input values to the activation module—for example, outside the range over which the lookup table operates, as is described above. It can therefore be advantageous to arrange the simple and complex paths such that data passes through the simple path before (if not bypassed) the complex path.

Figure 8:
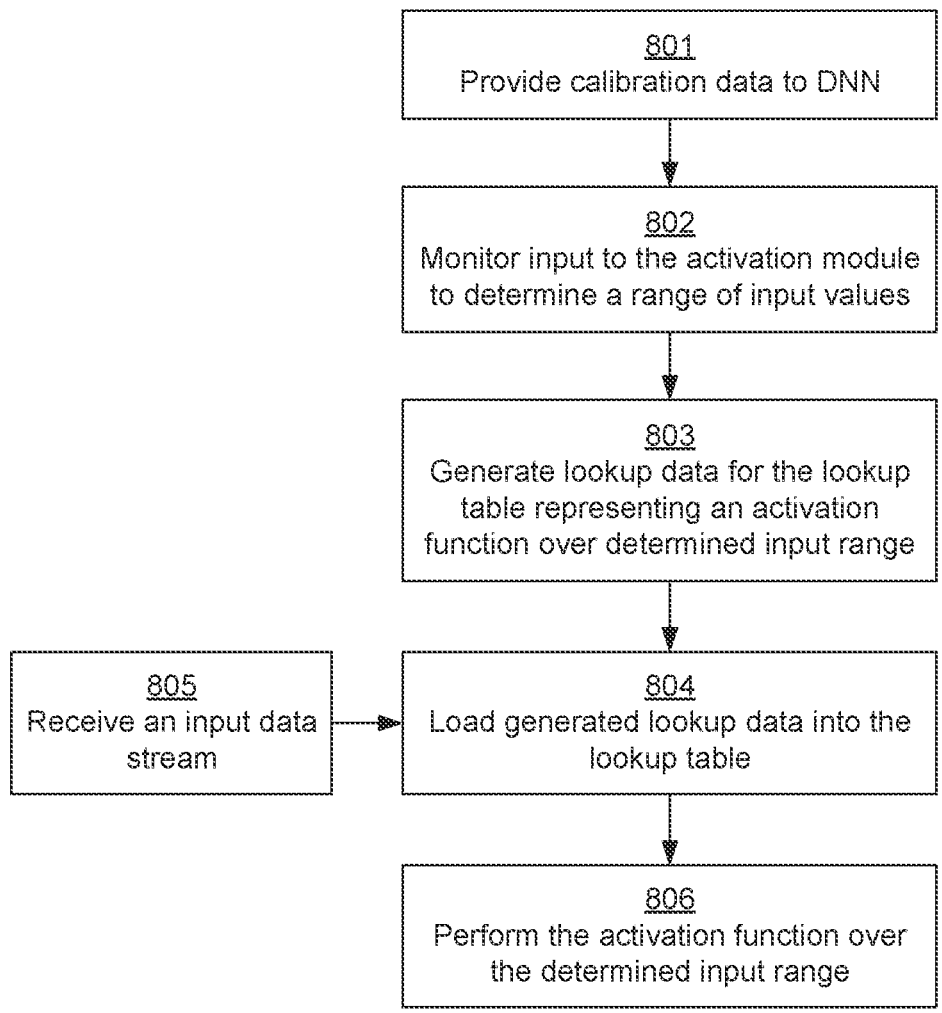
FIG. 8 shows a flowchart illustrating a method for performing an activation function in a hardware implementation of a Deep Neural Network.

A flowchart illustrating the method described herein is shown in FIG. 8. This method may be performed at a data processing system as shown in FIG. 6 which comprises a hardware implementation of a CNN as shown in FIG. 2. Preferably the method of FIG. 8 is performed following conventional optimisation of the neural network provided at the hardware implementation so that the parameters of the DNN which will be used during its operation have been established.

Calibration data (e.g. test data representing a typical range of inputs to the DNN during its operation) is provided to a representation of hardware for implementing the DNN 801. The hardware comprises activation modules that approximate the activation functions to be performed using lookup tables. By monitoring the input values 802 to an activation module of the hardware in the representation, a range of the input values to the activation module may be determined (e.g. according to any of the approaches described above). Lookup data is then generated 803 for the lookup table which represents the activation function over the determined range of input values. This allows the number of entries in the lookup table to be put to full use across the likely range of input values to the activation module. Range calibration steps 801-803 may be performed at a configuration module (e.g. software running at a training system) adapted for use with the representation of the hardware for implementing the DNN. The range calibration steps are typically performed at a calibration phase during training of a DNN.

During operation of the DNN (e.g. when the optimised DNN is implemented at hardware 200 according to the established filter weights and other configuration parameters, including the lookup data necessary to represent the desired activation functions at the lookup tables of the activation modules) and it is receiving an input data stream 805, the generated lookup data for an activation function at an activation module is loaded 804 into the lookup table on that activation module being required to perform that activation function. This enables the lookup table to perform the activation function 806 over the determined input range without wasting lookup table entries to input values that are unlikely to be received at the activation module.

This method may be performed across the activation modules of the hardware implementation and/or in respect of each activation function which the DNN demands is performed at each activation module.

In some embodiments, the methods described herein and/or a data processing system described herein may be implemented entirely in hardware—for example, as an integrated circuit.

The hardware logic shown in FIGS. 2, 3, 4d, 4f and 4g are shown as comprising a number of functional blocks. This is schematic only and is not intended to define a strict division between different logic elements of such entities. Each functional block may be provided in any suitable manner. It is to be understood that intermediate values described herein as being formed by hardware logic need not be physically generated at any point and may merely represent logical values which conveniently describe the processing performed by the logic between its input and output.

The hardware logic described herein may be embodied in hardware on an integrated circuit. A data processing system comprising the hardware logic described herein may be configured to perform any of the methods described herein. Generally, the functions, methods, techniques or components of a data processing system for training and implementing a Deep Neural Network described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. Those parts described herein capable of being implemented in software may be program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture hardware logic configured to perform those parts of any of the methods described herein which are described as being performed in hardware, or to manufacture hardware logic of any apparatus described herein. An integrated circuit definition dataset may be, for example, an integrated circuit description.

There may be provided a method of manufacturing, at an integrated circuit manufacturing system, hardware logic as described herein. There may be provided an integrated circuit definition dataset that, when processed in an integrated circuit manufacturing system, causes the method of manufacturing a hardware logic to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture hardware logic will now be described with respect to FIG. 9.

Figure 9:
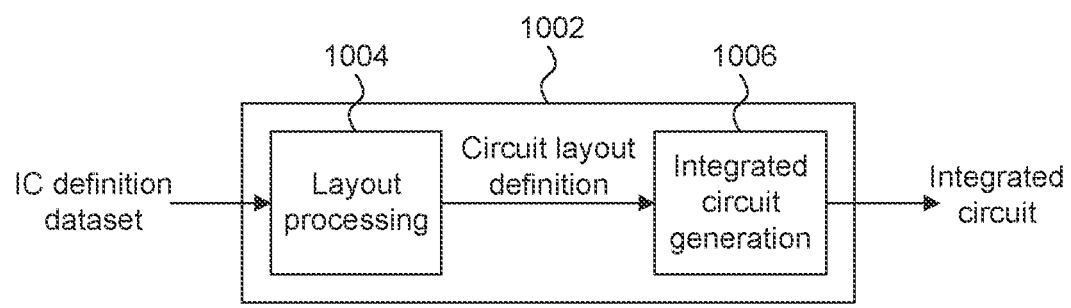
FIG. 9 is a schematic diagram of an integrated circuit manufacturing system.

FIG. 9 shows an example of an integrated circuit (IC) manufacturing system 1002 which is configured to manufacture hardware logic as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining hardware logic as described in any of the examples herein), process the IC definition dataset, and generate an IC according to the IC definition dataset (e.g. which embodies hardware logic as described in any of the examples herein). The processing of the IC definition dataset configures the IC manufacturing system 1002 to manufacture an integrated circuit embodying hardware logic as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a YYY without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. Hardware for implementing a Deep Neural Network (DNN) comprising an activation module for performing an activation function and a configuration module for determining a first range of input values to the activation module, the configuration module being configured to:
   cause calibration data to be provided to the hardware wherein the hardware is configured to implement the DNN on the calibration data; and
   monitor an input to the activation module of the hardware during implementation of the DNN on the calibration data so as to determine the first range of input values to the activation module; the activation module comprising:
   a programmable lookup table for storing lookup data representing an activation function over the first range of input values to the activation module; and
   a Rectified Linear Unit (ReLU) operable to perform a ReLU activation function;
   wherein the configuration module is further configured to, on the DNN requiring the activation module to implement a ReLU activation function, cause the activation module to perform the activation function at the ReLU and turn off the programmable lookup table.

2. Hardware as claimed in claim 1, wherein the configuration module is configured to, on the DNN requiring the activation module to implement an activation function using the programmable lookup table, cause the activation module to perform the activation function using the programmable lookup table and turn off the ReLU.

3. Hardware as claimed in claim 1, wherein, on the DNN requiring the activation module to implement an activation function using the programmable lookup table, the ReLU is configured to clamp input values received at the activation module which lie outside the first range of input values, the clamped input values being subsequently passed to the programmable lookup table for implementation of the activation function.

4. Hardware as claimed in claim 3, wherein the ReLU is configured to clamp the input values at the closest extreme of the first range of input values.

5. Hardware as claimed in claim 1, wherein the configuration module is configured to form a histogram of input values representing the probability of occurrence of input values and use as the bounds of the first range of input values a pair of input values between which a predefined or programmable proportion of the distribution of input values lies.

6. Hardware as claimed in claim 1, wherein the hardware is embodied on an integrated circuit.

7. Hardware as claimed in claim 1, wherein the configuration module is further configured to generate lookup data for the programmable lookup table representing the activation function over the first range of input values.

8. A method for implementing in hardware a Deep Neural Network (DNN), the hardware comprising an activation module for performing an activation function and a configuration module for determining a first range of input values to the activation module, the activation module comprising, a programmable lookup table for storing lookup data representing an activation function over a first range of input values to the activation module, and a Rectified Linear Unit (ReLU) operable to perform a ReLU activation function, the method comprising:
 causing calibration data to be provided to the hardware;
 monitoring an input to the activation module of the hardware during implementation of the DNN on the calibration data so as to determine the first range of input values to the activation module; and
 when the DNN requires the activation module to implement a ReLU activation function:
  turning off the programmable lookup table; and
  causing the activation module to perform the activation function at the ReLU.

9. The method as claimed in claim 8, further comprising:
 when the DNN requires the activation module to implement an activation function using the programmable lookup table:
  clamping the input values received at the activation module which lie outside of input values at the closest extreme of the first range of input values;
  subsequently passing the clamped input values to the programmable lookup table; and
  causing the activation module to perform the activation function using the programmable lookup table.

10. The method of claim 8, wherein the method further comprises:
 generating lookup data for the programmable lookup table representing the activation function over the first range of input values.

11. A non-transitory computer readable storage medium having stored thereon a computer readable dataset description of hardware for implementing a Deep Neural Network (DNN) comprising an activation module for performing an activation function and a configuration module for determining a first range of input values to the activation module, that, when processed in an integrated circuit manufacturing system, causes the integrated circuit manufacturing system to manufacture an integrated circuit embodying the hardware, wherein the configuration module is configured to cause calibration data to be provided to the hardware wherein the hardware is configured to implement the DNN on the calibration data and monitor an input to the activation module of the hardware during implementation of the DNN on the calibration data so as to determine the first range of input values to the activation module, the activation module comprising:
 a programmable lookup table for storing lookup data representing an activation function over the first range of input values to the activation module; and
 a Rectified Linear Unit (ReLU) operable to perform a ReLU activation function;
 wherein the configuration module is configured to, on the DNN requiring the activation module to implement a ReLU activation function, cause the activation module to perform the activation function at the ReLU and turn off the programmable lookup table.

* * * * *